(12) United States Patent
Tazartes et al.

(10) Patent No.: US 6,307,631 B1
(45) Date of Patent: *Oct. 23, 2001

(54) PSEUDORANDOM BIT SEQUENCE GENERATOR

(75) Inventors: Daniel A. Tazartes, West Hills; John G. Mark, Pasadena; David I. Tazartes, West Hollywood, all of CA (US)

(73) Assignee: Litton Systems Inc., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/607,471

(22) Filed: Jun. 30, 2000

Related U.S. Application Data

(63) Continuation of application No. 09/255,391, filed on Feb. 22, 1999, now Pat. No. 6,115,125.

(51) Int. Cl.[7] .................................................. G01C 19/72
(52) U.S. Cl. ........................... 356/460; 356/464; 708/250
(58) Field of Search .................................... 356/460, 464; 708/250, 251, 252; 380/46

(56) References Cited

U.S. PATENT DOCUMENTS

| | | | | |
|---|---|---|---|---|
| 3,984,668 | * | 10/1976 | Zetterberg et al. | 708/250 |
| 4,291,386 | * | 9/1981 | Bass | 708/252 |
| 4,748,576 | * | 5/1988 | Beker et al. | 708/250 |
| 5,446,683 | * | 8/1995 | Mullen et al. | 708/256 |
| 6,115,125 | * | 9/2000 | Tazartes et al. | 356/460 |

* cited by examiner

Primary Examiner—Samuel A. Turner
(74) Attorney, Agent, or Firm—Robert E. Malm

(57) ABSTRACT

The invention is a method and apparatus for generating a primary pseudorandom bit sequence consisting of a plurality of contiguous P subsequences. Each P subsequence consists of a start sequence of predetermined length followed by a sequence of trailing bits. The method comprises three steps. The first step consists of deriving a feedback bit from each generating sequence in a P subsequence in accordance with a specified rule where a generating sequence is any sequence of contiguous bits in the P subsequence having the same length as the start sequence. The bit that follows a generating sequence is called the trailing bit for that generating sequence. The second step of the method consists of determining a sequence of one or more modifier bits to be used in modifying the P subsequence. The third step of the method consists of modifying the P subsequence utilizing the one or more modifier bits.

44 Claims, 2 Drawing Sheets

PSEUDORANDOM BIT SEQUENCE GENERATOR

CROSS-REFERENCE TO RELATED APPLICATIONS

This is a continuation of application Ser. No. 09/255,391, filed Feb. 22, 1999 now U.S. Pat. No. 6,115,125.

STATEMENT REGARDING FEDERALLY SPONSORED RESEARCH AND DEVELOPMENT (Not applicable)

BACKGROUND OF THE INVENTION

This invention relates generally to fiber-optic gyroscopes and more specifically to the pseudorandom bit sequence generators that are used in such apparatus.

Fiber-optic gyros measure rate of rotation by determining the phase difference in light waves that propagate in opposite directions through a coil wound with optical fiber. Light waves that propagate through the coil in the direction of rotation take a longer time than light waves that propagate through the coil in the direction opposite to the direction of rotation. This difference in time, measured as the phase difference between counter-propagating light waves, is proportional to the angular velocity of the coil.

A typical block diagram for a fiber-optic gyro is shown in FIG. 1. A light source 2 supplies a reasonably coherent light beam to the optical-fiber interferometer 4 which causes the input light beam to be split into two light beams that are fed into opposite ends of an optical fiber 51 configured as a coil 56. The light beams emerging from opposite ends of the optical fiber are recombined into a single output light beam, which feeds into the detector 6.

In more detail, the light beam $W_i$ from light source 2 passes into port A and out of port C of directional coupler 52 and then into port A and out of ports C and D of directional coupler 54. Thus, two counter-propagating light beams $W_1$ and $W_2$ are established in coil 56. The counter-propagating light beams $W_1$ and $W_2$ are phase-modulated by modulator 58 and then pass into ports C and D of directional coupler 54 where they are combined into a single light beam $W_0$ that exits through port A. The combined light beam $W_0$ passes into port C of directional coupler 52, out of port B, and then into detector 6.

The output of the detector 6 is given by $$I = I_0/2[1 + \cos\theta(t)] \quad (1)$$

where $I_0$ is the peak light intensity and $\theta(t)$ is the phase difference between the two beams expressed as a function of time.

The phase difference $\theta(t)$ typically takes the form $$\theta(t) = [\Phi(t)]_{mod\ 2\pi} - [\Phi(t-\tau)]_{mod\ 2\pi} + \phi_S + 2\pi n \quad (2)$$

where $\Phi(t)$ is the phase-modulation generating function and $\Phi(t)_{mod\ 2\pi}$ is the phase modulation introduced by a phase modulator at one end of the fiber-optic coil in the interferometer 4, $\tau$ is the propagation time through the fiber optic coil, and $(\phi_S + 2\pi n)$ is the so-called Sagnac phase resulting from the rotation of the fiber-optic coil about its axis. The integer n (called the Sagnac fringe number) is either positive or negative and the Sagnac residual phase $\phi_S$ is constrained to the range $-\pi \leq \phi_S < \pi$.

The output of the detector 6 is converted to digital form by the analog-to-digital converter 8 and then processed in the digital processor 10 to yield at the output a measure of the rate and angle of rotation of the interferometer 4. In addition, the digital processor 10 generates a phase-modulation generating function $\Phi(t)$, the modulo-$2\pi$ portion of which is converted to analog form by the digital-to-analog converter 12 and supplied to the phase modulator in the interferometer 4.

The phase-modulation generating function $\Phi(t)$ typically consists of a number of phase-modulation components among which are $\Phi_{SE}(t)$ and $\Phi_M(t)$. The phase-modulation component $\Phi_{SE}(t)$ is typically a stepped waveform with steps that change in height by $-\phi_S$ at $\tau$ intervals where $\phi_{SE}$ is an estimate of $\phi_S$. Thus, the $\Phi_{SE}(t)$ modulation cancels in large part $\phi_{SE}$. The accurate measurement of the uncancelled portion of the Sagnac residual phase $\phi_S$ is of great importance in that it is the quantity that is used in refining the estimate of the Sagnac phase and generating the $\Phi_{SE}(t)$ phase-modulation component.

The accurate measurement of the uncancelled portion of the Sagnac residual phase is greatly facilitated by choosing the $\Phi_M(t)$ phase-modulation component such that $[\Phi_M(t) - \Phi_M(t-\tau)]$ is equal to $j\phi_M$ where the permitted values of j are the values −1 and 1 and $\phi_M$ is a predetermined positive phase angle somewhere in the vicinity $\pi/2$ radians where the slope of the cosine function is greatest. This effect can be achieved, for example, by having $\Phi_M(t)$ be a square wave with amplitude $\pi/2$ and period $2\tau$.

A method of fiber-optic gryo modulation using a pseudorandom bit sequence to control the sign j of the phase modulation quantity $j\phi_M$ was disclosed by Spahlinger in U.S. Pat. No. 5,123,741. This pseudorandom modulation approach improved gyro bias by canceling out cross-coupled electronic errors, which rectify in conventional deterministic modulation schemes. This approach was carried a step further by Mark & Tazartes in an invention disclosed in U.S. Pat. No. 5,682,241 wherein a method of random overmodulation (i.e. $\phi_M$ greater than $\pi/2$) simultaneously reduced bias errors (via pseudorandom modulation) and random walk (via overmodulation-see U.S. Pat. No. 5,530,545).

In the early development of pseudorandom modulation it was determined that sequences with short repetition periods were undesirable because of their relatively poor autocorrelation properties. Sequences with sufficient length (typically spanning on the order of 1 second) are used for fiber-optic gyro modulation. However, due to the random walk properties of pseudorandom sequences, it was found that these sequences generated large low-frequency components. These low-frequency components are undesirable because they do not transmit well through AC-coupled circuits, as is usually the case with the optical detector circuitry used in fiber-optic gyros. Further, the low frequencies imply that for extended periods of time the gyro may operate predominantly with one modulation sign. During these periods, the gyro signal may be subject to offset drifts, intensity drifts, or gain drifts.

BRIEF SUMMARY OF THE INVENTION

The invention is a method and apparatus for generating a primary pseudorandom bit sequence consisting of a plurality of contiguous P subsequences. Each P subsequence consists of a start sequence of predetermined length followed by a sequence of trailing bits. The method comprises three steps. The first step consists of deriving a feedback bit from each generating sequence in a P subsequence in accordance with a specified rule where a generating sequence is any sequence of contiguous bits in the P subsequence having the same length as the start sequence. The bit that follows a generating sequence is called the trailing bit for that generating sequence.

The second step of the method consists of determining a sequence of one or more modifier bits to be used in modifying the P subsequence.

The third step of the method consists of modifying the P subsequence utilizing the one or more modifier bits.

DETAILED DESCRIPTION OF THE INVENTION

Figure 1:
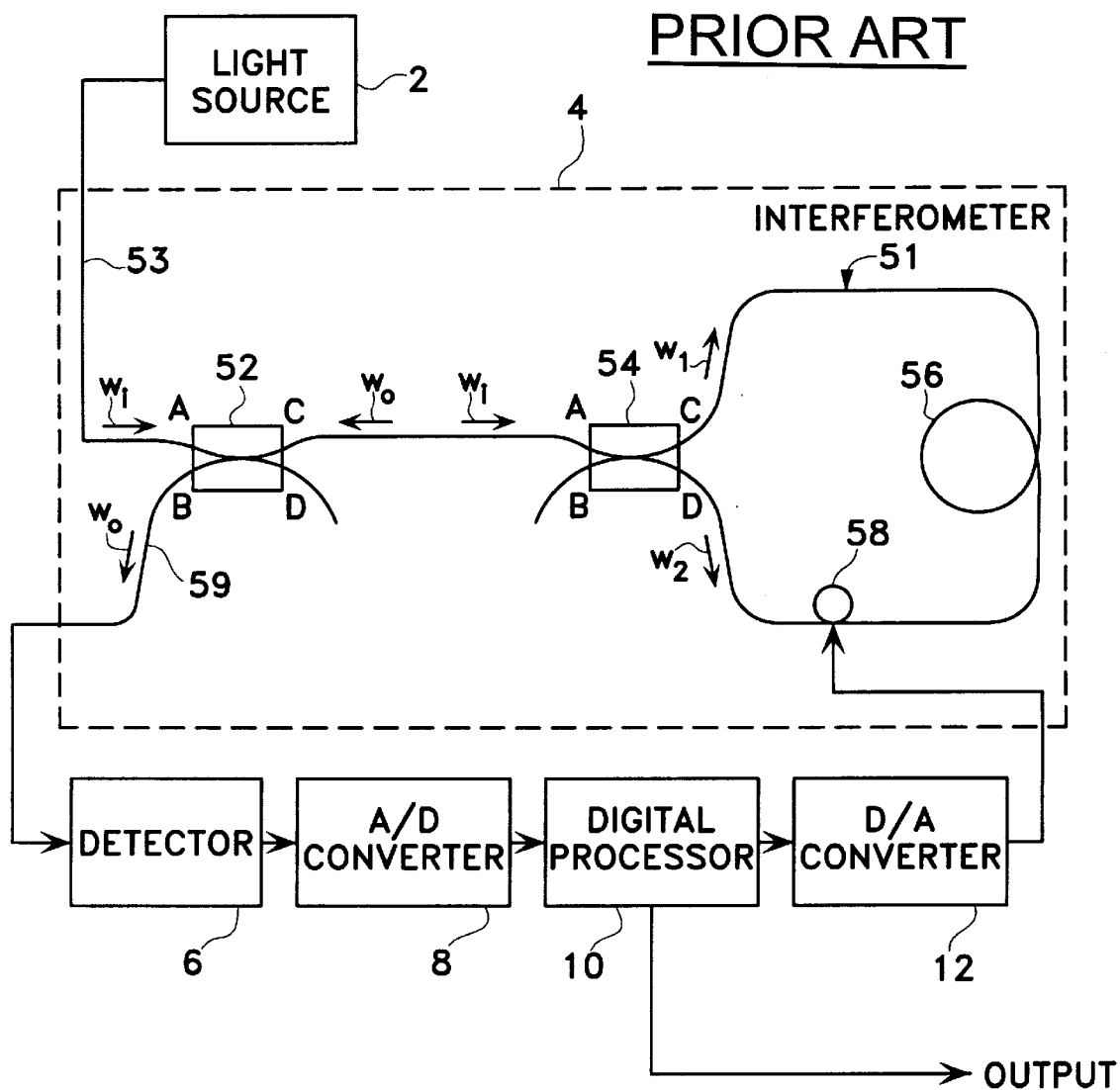
FIG. 1 is a block diagram of a fiber-optic gyro and associated control loop.
Figure 2:
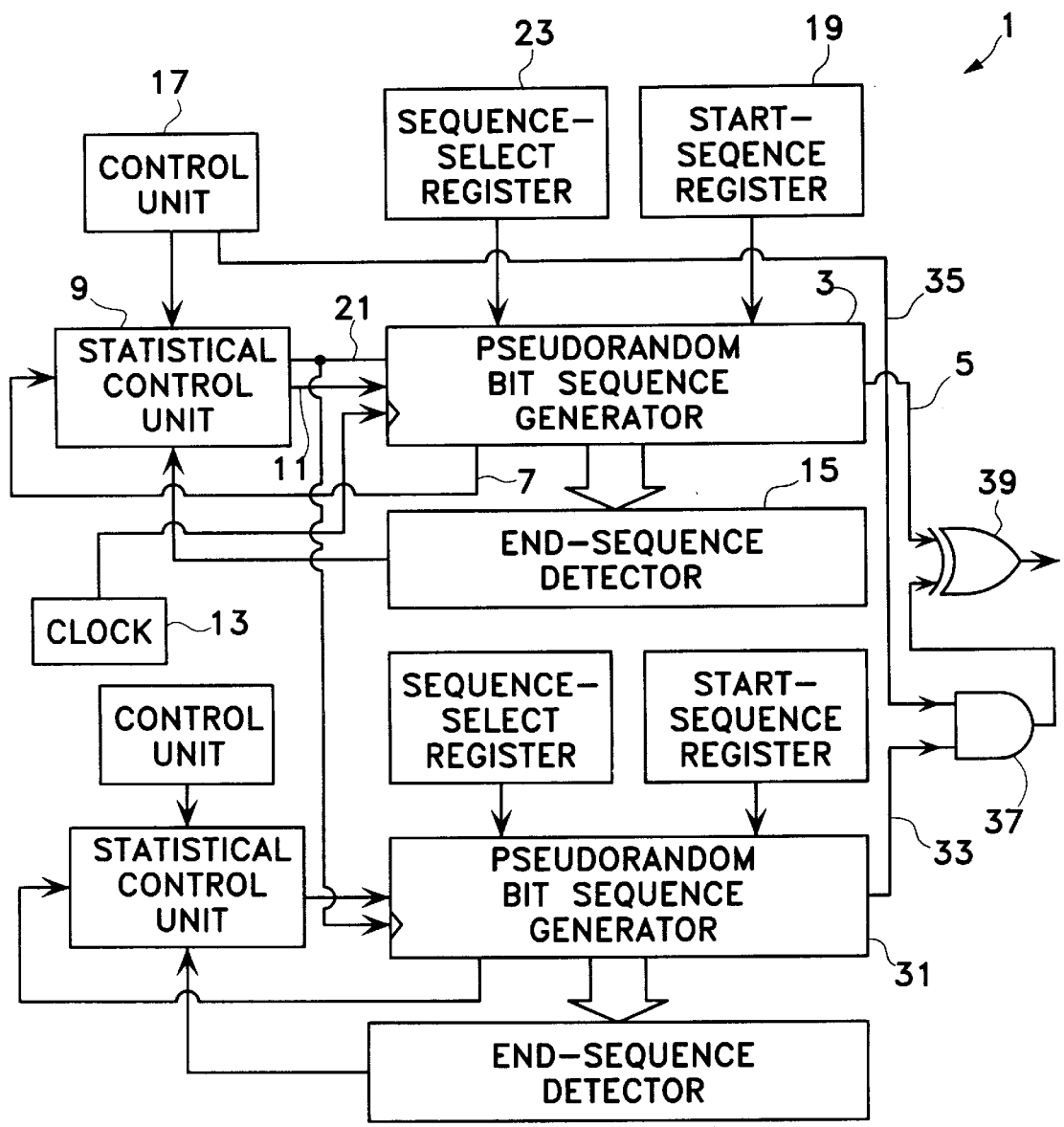
FIG. 2 is a block diagram of an embodiment of the present invention.

The present invention is a method and apparatus for generating pseudorandom bit sequences with improved statistical properties. An embodiment 1 of the invention is shown in FIG. 2.

The pseudorandom bit sequence generator 3 produces a pseudorandom bit sequence on output line 5. The pseudorandom bit sequence generator 3 can be any type of bit sequence generator that produces a sequence with statistical properties that approximates those of a random bit sequence generator. Bit sequence generators which produce maximum-length bit sequences (m-sequences) are frequently used for this purpose and are described in numerous textbooks, e.g. W. Wesley Peterson, *Error Correcting Codes*, M.I.T. Press/John Wiley & Sons, Inc., New York, 1961, pp. 147–48.

A predetermined number of the most recent bits of the pseudorandom bit sequence reside in a shift register within the pseudorandom bit sequence generator 3. The pseudorandom bit sequence generator 3 determines the next bit of the sequence (which will be referred to herein as the feedback bit) from the contents of the shift register and places it on output line 7. The feedback bit is usually allowed to pass through the bit-balancing unit 9 to the data input line 11 of the shift register and enter the shift register when the contents of the shift register are shifted by an appropriate transition in the clock signal supplied by clock 13. After the shift, the oldest bit stored in the shift register appears on the output line 5. Thus, a new bit of the pseudorandom bit sequence is produced on output line 5 with each appropriate transition of the clock signal.

An end sequence is stored in end-sequence detector 15. When the contents of the shift register in the pseudorandom bit sequence generator 3 matches the end sequence stored in the end-sequence detector 15, the end-sequence detector 15 issues an end-sequence alert to the statistical control unit 9. If the statistical control unit 9 is enabled by control unit 17, a stored modifier bit sequence is then fed bit-by-bit on data input line 11 to the shift register in the pseudorandom bit sequence generator 3 rather than the feedback bit sequence appearing on line 7. The modifier bit sequence marks the actual end of the pseudorandom sequence appearing on line 5.

The modifier bit sequence can be used to balance the "0's" and "1's" in the pseudorandom bit sequence appearing on line 5. For example, if the number of "1's" exceeds by one the number of "0's" in the pseudorandom bit sequence beginning with a start sequence and concluding with the end sequence, then the modifier bit sequence could consist of a single "0" or perhaps the sequence "0", "0", "1". Similarly, if the unbalance were in favor of "0's", then the modifier bit sequence could consist of a single "1" or perhaps the sequence "1", "0", "1".

This invention is much more sophisticated than this simple example suggests. The pseudorandom bit sequence that appears on line 5 consists of contiguous subsequences. A subsequence begins with a start sequence and ends at the beginning of the next start sequence. Let us denote the bit sequence appearing on data input line 11 to the shift register as the trailing bit sequence. In general, a trailing bit can be either a feedback bit or a modifier bit. It is not required that trailing bits be exclusively feedback bits from the start sequence to the end of the end sequence. In fact, interesting statistical properties can be obtained by inserting one or more modifier bits after the start sequence and before the occurrence of the end-sequence alert.

For example, assume that we have only one modifier bit to be inserted in a subsequence and that we insert the modifier bit after the start sequence and prior to the end-sequence alert. Further, let the modifier bit be the complement of whichever feedback bit it is to replace. Then the length of the subsequence will vary depending on where the modifier bit is inserted in the subsequence. We could complicate the process somewhat and obtain more dramatic results by substituting a sequence of modifier bits for a sequence of feedback bits where the modifier bits are complements of the corresponding feedback bits.

Rather than complementing the feedback bits to obtain the modifier bits, we could use other mapping procedures. We can also replace one or more contiguous feedback bits by one or more modifier bits at pseudorandom intervals within a subsequence, thereby causing the subsequence lengths to be distributed in accordance with some probability density function. This process would typically result in an unbalance in "0's" and "1's" in the start sequence and the feedback trailing bits of a given subsequence and it may be appropriate to provide a compensating unbalance in the "0's" and "1's" of the modifier trailing bits for the subsequence that follows the given subsequence.

The derivation of one or more modifier bits can be based on a statistic of a subsequence. For example, suppose the statistic is an unbalance in "0's" and "1's" in the start sequence and feedback trailing bits in a subsequence. Modifier bits designed to compensate for this unbalance could be inserted in the subsequence after the end-sequence alert thereby obtaining a subsequence that is balanced in "0's" and "1's". One might also obtain a balance by inserting the compensating modifier bits anywhere in the next subsequence. Then the balancing effect takes place over many subsequences.

The derivation of one or more modifier bits can also be based simply on obtaining a change in a statistical property of the pseudorandom bit sequence. For example, if each subsequence in a pseudorandom bit sequence is a specific m-sequence, then all of the subsequences would have the same length. One might not like the periodicity associated with such a pseudorandom bit sequence and one might choose to enter modifier bits at pseudorandom intervals in the specific m-sequence thereby obtaining a pseudorandom bit sequence consisting of subsequences of different lengths. In this case, one is inserting modifier bits to obtain a different probability density function for the lengths of the subsequences that make up the pseudorandom bit sequence.

In summary, it is the object of the invention, given a procedure for generating a pseudorandom bit sequence by the feedback bit approach, to change one or more statistical properties of the pseudorandom bit sequence by substituting modifier bits for feedback bits, howsoever the modifier bits are derived. In implementing this process, one specifies what modifier bits are to be inserted in each subsequence and exactly where in each subsequence the modifier bits are to be inserted, the overall objective being to achieve a change in a statistical property.

If the statistical control unit 9 is not enabled by control unit 15, then the feedback bit stream on line 7 flows through the statistical control unit 9 to line 11, and the modifier bit sequence is never inserted into the pseudorandom bit sequence appearing on line 5.

The start sequence is stored in start-sequence register 19. The statistical control unit 9 places a signal on control line 21 and thereby causes the contents of the start-sequence register 19 to be loaded into the shift register of pseudorandom bit sequence generator 3 on the next appropriate clock-signal transition after the last bit of the subsequence has appeared on output line 5. The process described above is then repeated.

The feedback-bit generating process utilized by pseudorandom bit sequence generator 3 consists of performing certain logical operations on the states of two or more stages of the shift register in pseudorandom bit sequence generator 3. The selection of shift-register stages for this purpose is accomplished by sequence-select register 23.

Pseudorandom bit sequence generator 31 operates in the same way as pseudorandom bit sequence generator 3 except for the clocking. The clock signal for pseudorandom bit sequence generator 31 is obtained from line 21 which means that a new bit is produced on output line 33 each time a start sequence is entered into pseudorandom bit sequence generator 3.

If control unit 17 causes a "1" to appear on control line 35, the pseudorandom bit sequence produced by pseudorandom bit sequence generator 31 passes through AND gate 37 to EXCLUSIVE OR gate 39. If the bit produced by pseudorandom bit sequence generator 31 is a "0", the pseudorandom bit sequence produced by pseudorandom bit sequence generator 3 will pass through EXCLUSIVE OR gate 39 unchanged. If the bit produced by pseudorandom bit sequence generator 31 is a "1", the pseudorandom bit sequence produced by pseudorandom bit sequence generator 3 is inverted in passing through EXCLUSIVE OR gate 39. Thus, if the statistical control unit 9 is not enabled and if a "1" appears on control line 35, the "0's" and "1's" in pseudorandom bit sequence from EXCLUSIVE OR gate 39 will be balanced over two periods of the pseudorandom bit sequence from pseudorandom bit sequence 3 even though the "0's" and "1's" in pseudorandom bit sequence from pseudorandom bit sequence 3 are unbalanced over a single period.

What is claimed is:

1. A method for generating a primary pseudorandom bit sequence, a primary pseudorandom bit sequence consisting of a plurality of contiguous P subsequences, each P subsequence consisting of a start sequence of predetermined length followed by a sequence of trailing bits, the method comprising the steps:

(a) deriving a feedback bit from each generating sequence in a P subsequence in accordance with a specified rule, a generating sequence being any sequence of contiguous bits in the P subsequence having the same length as the start sequence, the bit that follows a generating sequence being called the trailing bit for that generating sequence;

(b) determining a sequence of one or more modifier bits to be used in modifying the P subsequence;

(c) modifying the P subsequence utilizing the one or more modifier bits.

2. The method of claim 1 wherein step (c) comprises the steps:

(c1) selecting either the feedback bit or a modifier bit as the trailing bit in accordance with a specified rule, the trailing bit immediately following the generating sequence from which the feedback bit was derived.

3. The method of claim 2 wherein the primary pseudorandom bit sequence would be a repeating m-sequence if the feedback bit were always selected as the trailing bit.

4. The method of claim 2 wherein the primary pseudorandom bit sequence would be a modulo-2 sum of a plurality of repeating m-sequences if the feedback bit were always selected as the trailing bit.

5. The method of claim 2 wherein in step (a) a feedback bit for a generating sequence is the modulo-2 sum of two or more bits in the generating function.

6. The method of claim 2 wherein in step (b) the determination of a sequence of one or more modifier bits to be used as trailing bits in a P subsequence is based on a statistic of the preceding P subsequence.

7. The method of claim 2 wherein step (b) comprises the steps:

(b1) determining the difference of "0's" and "1's" in the start sequence and the trailing bits that are feedback bits in a P subsequence;

(b2) determining a sequence of one or more modifier bits, the difference of "0's" and "1's" in the sequence of modifier bits being the negative of the difference determined in step (b1).

8. The method of claim 2 wherein in step (c) the feedback bits are used exclusively as trailing bits from the end of the start sequence to the end of an end sequence and the modifier bits are used exclusively as trailing bits from the end of the end sequence to the beginning of the next start sequence, an end sequence being a predetermined sequence having the same length as the start sequence.

9. The method of claim 2 wherein in step (c) all or a portion of the modifier bits are trailing bits from the end of the start sequence to the end of the end sequence, any portion of the modifier bits remaining unused as trailing bits at the end of the end sequence being trailing bits between the end of the end sequence and the beginning of the next start sequence, an end sequence being a predetermined sequence having the same length as the start sequence.

10. The method of claim 9 wherein in step (c) all or a portion of the modifier bits are entered as trailing bits at pseudorandom intervals from the end of the start sequence to the end of the end sequence.

11. The method of claim 1 wherein in step (b) the sequence of one or more modifier bits is a secondary pseudorandom bit sequence, step (b) comprising the steps:

(b1) generating a secondary pseudorandom bit sequence consisting of a plurality of contiguous S subsequences, each S subsequence consisting of a start sequence of predetermined length followed by a sequence of trailing bits, a feedback bit from each generating sequence in an S subsequence being derived in accordance with a specified rule, a generating sequence being any sequence of contiguous bits in the S subsequence having the same length as the start sequence, the bit that follows a generating sequence being called the trailing bit for that generating sequence;

(b2) determining a sequence of one or more modifier bits to be used in modifying the S subsequence;

(b3) modifying the S subsequence utilizing the one or more modifier bits.

12. The method of claim 11 wherein the secondary pseudorandom bit sequence would be a repeating m-sequence if the feedback bit were always selected as the trailing bit.

13. The method of claim 11 wherein the secondary pseudorandom bit sequence would be a modulo-2 sum of a plurality of repeating m-sequences if the feedback bit were always selected as the trailing bit.

14. The method of claim 11 wherein in step (b1) a feedback bit for a generating sequence is the modulo-2 sum of two or more bits in the generating function.

15. The method of claim 11 wherein in step (b2) the determination of a sequence of one or more modifier bits to be used as trailing bits in an S subsequence is based on a statistic of the preceding S subsequence.

16. The method of claim 11 wherein step (b2) comprises the steps:

(b2a) determining the difference of "0's" and "1's" in the start sequence and the trailing bits that are feedback bits in an S subsequence;

(b2b) determining a sequence of one or more modifier bits, the difference of "0's" and "1's" in the sequence of modifier bits being the negative of the difference determined in step (b2a).

17. The method of claim 11 wherein in step (b3) the feedback bits are used exclusively as trailing bits from the end of the start sequence to the end of an end sequence and the modifier bits are used exclusively as trailing bits from the end of the end sequence to the beginning of the next start sequence, an end sequence being a predetermined sequence having the same length as the start sequence.

18. The method of claim 11 wherein in step (b3) all or a portion of the modifier bits are trailing bits from the end of the start sequence to the end of the end sequence, any portion of the modifier bits remaining unused as trailing bits at the end of the end sequence being trailing bits between the end of the end sequence and the beginning of the next start sequence, an end sequence being a predetermined sequence having the same length as the start sequence.

19. The method of claim 18 wherein in step (b3) all or a portion of the modifier bits are used as trailing bits from the end of the start sequence to the end of the end sequence, the modifier bits being entered as trailing bits at pseudorandom intervals prior to the end of the end sequence.

20. The method of claim 1 wherein in step (b) the sequence of one or more modifier bits is a secondary pseudorandom bit sequence, step (c) comprising the step:

(c1) adding modulo 2 each successive bit of the secondary pseudorandom bit sequence to each successive P subsequence of the primary pseudorandom bit sequence.

21. An apparatus for generating a primary pseudorandom bit sequence, the apparatus comprising:

a primary bit sequence analyzer having access to a primary analysis sequence, a primary analysis sequence being a plurality of the most recent bits from a primary bit sequence, the primary bit sequence comprising a plurality of contiguous P subsequences, each P subsequence beginning with a start sequence, the primary bit sequence analyzer deriving a feedback bit from the primary analysis sequence;

a sequence-modifying unit for supplying the primary bit sequence analyzer with a trailing bit that follows the primary analysis sequence, the trailing bit being either the feedback bit derived by the primary bit sequence analyzer or a modifier bit, the modifier bit being either a predetermined bit stored in the sequence-modifying unit or a bit derived by the sequence-modifying unit.

22. The apparatus of claim 21 wherein the primary bit sequence would be a repeating m-sequence if the sequence-modifying unit were to continually supply the feedback bit as the trailing bit.

23. The apparatus of claim 21 wherein the primary bit sequence would be a modulo-2 sum of a plurality of repeating m-sequences if the sequence-modifying unit were to continually supply the feedback bit as the trailing bit.

24. The apparatus of claim 21 wherein the primary bit sequence analyzer comprises:

a shift register for storing the primary analysis sequence, the shift register having (1) an input port for receiving a trailing bit from the sequence-modifying unit for entry into the first stage of the shift register when the contents of the shift register are shifted, and (2) an output port for reading the contents of the last stage of the shift register, the oldest bit of the primary analysis sequence being available at the output port;

a feedback bit generator for generating the feedback bit to be supplied to the sequence-modifying unit, the feedback bit being derived from the contents of the shift register;

an end-sequence detector which produces an end-sequence alert when an end-sequence is detected in the shift register.

25. The apparatus of claim 24 wherein the shift register has a parallel entry port, the sequence-modifying unit performing a parallel entry of the start sequence into the shift register followed by a serial entry of a sequence of trailing bits, each of the sequence of trailing bits being a feedback bit prior to the occurrence of the end-sequence alert.

26. The apparatus of claim 24 wherein the trailing bits after the occurrence of an end-sequence alert are a sequence of zero or more modifier bits, the sequence-modifying unit entering the start sequence into the shift register after the sequence of zero or more modifier bits.

27. The apparatus of claim 24 wherein the sequence-modifying unit feeds a portion or all of a sequence of modifier trailing bits either contiguously or interspersed with the feedback trailing bits into the shift register prior to the occurrence of the end-sequence alert, any portion of the sequence of modifier trailing bits remaining after the occurrence of the end-sequence alert being fed contiguously into the shift register after the end-sequence alert.

28. The apparatus of claim 24 wherein the sequence-modifying unit feeds only feedback trailing bits into the shift register prior to the end-sequence alert and only modifier trailing bits into the shift register after the end-sequence alert, the difference in "0's" and "1's" for the start sequence and the feedback trailing bits in a subsequence being equal to the negative of the difference in "0's" and "1's" in the sequence of modifier trailing bits.

29. The apparatus of claim 24 wherein the sequence-modifying unit feeds a portion or all of a sequence of modifier trailing bits either contiguously or interspersed with the feedback trailing bits into the shift register prior to the occurrence of the end-sequence alert, any portion of the sequence of modifier trailing bits remaining after the occurrence of the end-sequence alert being fed contiguously into the shift register after the end-sequence alert, the sequence-modifying unit determining a first difference and a second difference, the first difference being the difference in "0's"

and "1's" for the start sequence and the feedback trailing bits in the P subsequence preceding the present P subsequence, the second difference being the difference in "0's" and "1's" in a sequence of modifier bits to be entered into the shift register during the generation of the present P subsequence, the second difference being equal to the negative of the first difference.

30. The apparatus of claim 24 wherein the sequence-modifying unit comprises:
a pseudorandom timing unit that generates a signal denoting pseudorandom timing intervals, the sequence-modifying unit feeding the bits comprising all or part of the sequence of modifier trailing bits into the shift register at pseudorandom intervals after the start sequence and before the end-sequence alert occurs.

31. The apparatus of claim 21 wherein the sequence-modifying unit comprises:
a secondary bit sequence analyzer that provides a secondary bit sequence, the sequence-modifying unit utilizing the secondary bit sequence to modify the primary bit sequence.

32. The apparatus of claim 31 wherein the sequence-modifying unit provides at an output port the modulo-2 sum of each successive bit of the secondary bit sequence and the bits in each successive P subsequence of the primary bit sequence.

33. The apparatus of claim 31 wherein the secondary bit sequence analyzer has access to a secondary analysis sequence, a secondary analysis sequence being a plurality of the most recent bits from a secondary bit sequence, the secondary bit sequence comprising a plurality of contiguous S subsequences, each S subsequence beginning with a start sequence, the secondary bit sequence analyzer deriving a feedback bit from the secondary analysis sequence, the sequence-modifying unit supplying the secondary bit sequence analyzer with a trailing bit that follows the secondary analysis sequence, the trailing bit being either the feedback bit derived by the secondary bit sequence analyzer or a modifier bit, the modifier bit being either a predetermined bit stored in the sequence-modifying unit or a bit derived by the sequence-modifying unit.

34. The apparatus of claim 33 wherein the secondary bit sequence would be a repeating m-sequence if the sequence-modifying unit were to continually supply the feedback bit to the secondary bit sequence analyzer as the trailing bit.

35. The apparatus of claim 33 wherein the secondary bit sequence would be a modulo-2 sum of a plurality of repeating m-sequences if the sequence-modifying unit were to continually supply the feedback bit to the secondary bit sequence analyzer as the trailing bit.

36. The apparatus of claim 33 wherein the secondary bit sequence analyzer comprises:
a shift register for storing the secondary analysis sequence, the shift register having (1) an input port for receiving a trailing bit from the sequence-modifying unit for entry into the first stage of the shift register when the contents of the shift register are shifted, and (2) an output port for reading the contents of the last stage of the shift register, the oldest bit of the secondary analysis sequence being available at the output port;
a feedback bit generator for generating the feedback bit to be supplied to the sequence-modifying unit, the feedback bit being derived from the contents of the shift register;
an end-sequence detector which produces an end-sequence alert when an end-sequence is detected in the shift register.

37. The apparatus of claim 36 wherein the shift register has a parallel entry port, the sequence-modifying unit performing a parallel entry of the start sequence into the shift register followed by a serial entry of a sequence of trailing bits, each of the sequence of trailing bits being a feedback bit prior to the occurrence of the end-sequence alert.

38. The apparatus of claim 36 wherein the trailing bits after the occurrence of an end-sequence alert are a sequence of zero or more modifier bits, the sequence-modifying unit entering the start sequence into the shift register after the sequence of zero or more modifier bits.

39. The apparatus of claim 36 wherein the sequence-modifying unit feeds a portion or all of a sequence of modifier trailing bits either contiguously or interspersed with the feedback trailing bits into the shift register prior to the occurrence of the end-sequence alert, any portion of the sequence of modifier trailing bits remaining after the occurrence of the end-sequence alert being fed contiguously into the shift register after the end-sequence alert.

40. The apparatus of claim 36 wherein the sequence-modifying unit feeds only feedback trailing bits into the shift register prior to the end-sequence alert and only modifier trailing bits into the shift register after the end-sequence alert, the difference in "0's" and "1's" for the start sequence and the feedback trailing bits in an S subsequence being equal to the negative the difference in "0's" and "1's" in the sequence of modifier trailing bits.

41. The apparatus of claim 36 wherein the sequence-modifying unit feeds a portion or all of a sequence of modifier trailing bits either contiguously or interspersed with the feedback trailing bits into the shift register prior to the occurrence of the end-sequence alert, any portion of the sequence of modifier trailing bits remaining after the occurrence of the end-sequence alert being fed contiguously into the shift register after the end-sequence alert, the sequence-modifying unit determining a first difference and a second difference, the first difference being the difference in "0's" and "1's" for the start sequence and the feedback trailing bits in the S subsequence preceding the present S subsequence, the second difference being the difference in "0's" and "1's" in a sequence of modifier bits to be entered into the shift register during the generation of the present S subsequence, the second difference being equal to the negative of the first difference.

42. The apparatus of claim 36 wherein the sequence-modifying unit comprises:
a pseudorandom timing unit that generates a signal denoting pseudorandom timing intervals, the sequence-modifying unit feeding the bits comprising all or part of the sequence of modifier trailing bits into the shift register at pseudorandom intervals after the start sequence and before the end-sequence alert occurs.

43. The apparatus of claim 33 wherein the sequence-modifying unit utilizes a statistic of an S subsequence preceding the present S subsequence to determine one or more modifier bits to be entered as trailing bits in the present S subsequence.

44. The apparatus of claim 21 wherein the sequence-modifying unit utilizes a statistic of a P subsequence preceding the present P subsequence to determine one or more modifier bits to be entered as trailing bits in the present P subsequence.

* * * * *